(12) United States Patent
Yasu et al.

(10) Patent No.: US 9,964,179 B2
(45) Date of Patent: May 8, 2018

(54) CHAIN

(71) Applicant: TSUBAKIMOTO CHAIN CO., Osaka-shi, Osaka (JP)

(72) Inventors: Takuya Yasu, Osaka (JP); Yusuke Nishizawa, Osaka (JP); Yuma Kanatani, Osaka (JP); Kentaro Yamamoto, Osaka (JP)

(73) Assignee: TSUBAKIMOTO CHAIN CO., Osaka-shi (JP)

(*) Notice: Subject to any disclaimer, the term of this patent is extended or adjusted under 35 U.S.C. 154(b) by 0 days. days.

(21) Appl. No.: 15/328,573

(22) PCT Filed: Jul. 17, 2015

(86) PCT No.: PCT/JP2015/070607
§ 371 (c)(1),
(2) Date: Jan. 24, 2017

(87) PCT Pub. No.: WO2016/031428
PCT Pub. Date: Mar. 3, 2016

(65) Prior Publication Data
US 2017/0211660 A1    Jul. 27, 2017

(30) Foreign Application Priority Data
Aug. 29, 2014 (JP) ................. 2014-175053

(51) Int. Cl.
| F16G 13/16 | (2006.01) |
| F16G 13/06 | (2006.01) |
| F16G 15/06 | (2006.01) |
| F16G 13/02 | (2006.01) |

(52) U.S. Cl.
CPC ............ *F16G 13/06* (2013.01); *F16G 13/02* (2013.01); *F16G 15/06* (2013.01)

(58) Field of Classification Search
CPC ........... F16G 13/06; F16G 15/06; F16G 13/02
(Continued)

(56) References Cited

U.S. PATENT DOCUMENTS 4,615,171 A * 10/1986 Burk ................. F16G 13/06
                                                    29/898.1
5,154,674 A   10/1992 Avramidis et al.
(Continued)

FOREIGN PATENT DOCUMENTS

| CN | 1240890 A | 1/2000 |
| JP | 11-351338 A | 12/1999 |

(Continued)

OTHER PUBLICATIONS

International Search Report dated Oct. 6, 2015, issued in counterpart application No. PCT/JP2015/070607. (2 pages).
(Continued)

*Primary Examiner* — David B Jones
(74) *Attorney, Agent, or Firm* — Westerman, Hattori, Daniels & Adrian, LLP

(57) ABSTRACT

A chain includes two inner link plates, cylindrical bushings, each of which has opposite ends joined to the inner link plates, pins each inserted into a bushing, solid lubricant provided between the bushings and the pins, and two outer link plates that sandwich the inner link plates from outside. The ends of the pins extend through the outer link plates. The chain further includes projections, which maintain the distances between the outer surfaces of the inner link plates and the inner surfaces of the outer link plates, and absorbent members, which are arranged between the outer surfaces of the inner link plates and the inner surfaces of the outer link plates. The absorbent members confine the solid lubricant and are capable of absorbing liquid.

4 Claims, 3 Drawing Sheets

(58) Field of Classification Search
USPC .................................................. 59/78, 86
See application file for complete search history.

(56) References Cited

U.S. PATENT DOCUMENTS

| | | | |
|---|---|---|---|
| 8,136,339 B2* | 3/2012 | Kondo | C10M 107/38 29/898.054 |
| 2007/0155563 A1* | 7/2007 | Aoki | F16G 13/06 474/206 |
| 2013/0267364 A1 | 10/2013 | Motoshima et al. | |
| 2014/0057750 A1 | 2/2014 | Yokoyama | |

FOREIGN PATENT DOCUMENTS

| | | |
|---|---|---|
| JP | 2002-139106 A | 5/2002 |
| JP | 2002-295600 A | 10/2002 |
| JP | 2007-170493 A | 7/2007 |
| JP | 2008-106901 A | 5/2008 |
| TW | 200925267 A | 6/2009 |
| TW | I340213 B | 4/2011 |
| TW | 201207272 A | 2/2012 |
| TW | I374984 B1 | 10/2012 |
| TW | I418600 B | 12/2013 |

OTHER PUBLICATIONS

International Preliminary Report on Patentability (Form PCT/IB/373) issued in counterpart International Application No. PCT/JP2015/070607 dated Feb. 28, 2017, with Form PCT/ISA/237. (6 pages).

* cited by examiner

CHAIN

BACKGROUND OF THE INVENTION

The present invention relates to a chain that includes solid lubricant such as graphite between a bushing and a pin.

BACKGROUND ART

Conventionally, for example, Patent Document 1 discloses such a chain. The chain of Patent Document 1 includes sliding members made of graphite placed between bushings and pins. To limit leakage of abrasion powder to the outside when the sliding member wears, an O-ring surrounding the outer circumference of the pin is arranged between the end face of the bushing and the outer plate.

PRIOR ART DOCUMENT

Patent Document

Patent Document 1: Japanese Laid-Open Patent Publication No. 2007-170493

SUMMARY OF THE INVENTION

The O-rings in chains as described above are made of rubber. Thus, during the use of the chain, the O-ring wears due to sliding on the bushings and the outer plates. If a crack forms even in part of the O-ring, the O-ring may tear from the crack and come off. Therefore, there is still room for improvement in limiting leakage of abrasion powder of sliding members to the outside for an extended period of time.

The present invention focuses on such a problem of the conventional technology. The objective of the present invention is to provide a chain that is capable of limiting leakage of solid lubricant between a pin and a bushing to the outside for an extended period of time.

To achieve the foregoing objective and in accordance with a first aspect of the present invention, a chain is provided that includes two inner link plates, a pin inserted in the bushing, solid lubricant arranged between the bushing and the pin, two outer link plates, distance maintaining portions, and absorbent members. The two inner link plates are opposed to and spaced from each other. The cylindrical bushing has two opposite ends, each of which is joined to one of the inner link plates. The outer link plates are arranged to sandwich the inner link plates from outside. The opposite ends of the pin each extend through one of the outer link plates. Each distance maintaining portions maintains a distance between an outer surface of one of the inner link plate and an inner surface of the corresponding outer link plate. Each absorbent members is arranged between the outer surface of one of the inner link plate and the inner surface of the corresponding outer link plate. The absorbent members confine the solid lubricant and are capable of absorbing liquid.

With this configuration, the solid lubricant between the pin and the bushing is confined by the absorbent member, which is capable of absorbing liquid. Even if the absorbent member is cut partly, it is less likely to tear and come off than conventional O-rings. The configuration thus limits leakage of the solid lubricant between the pin and the bushing to the outside for a longer period of time than conventional configurations.

The absorbent members preferably absorb and retain liquid lubricant.

With this configuration, the liquid lubricant retained by the absorbent member is provided between the pin and the bushing, which improves the lubricity of the pin and the bushing.

Opposite ends of the bushing preferably extend through the inner link plates and project to the outside of the inner link plates, and the distance maintaining portions are preferably constituted by projections that project to the outside of the inner link plates at the opposite ends of the bushing.

With this configuration, the distance between the outer surface of the inner link plate and the inner surface of the outer link plate can be maintained without increasing the number of components.

The absorbent members preferably each contact the outer surface of the corresponding inner link plate and the inner surface of the corresponding outer link plate, while surrounding an outer circumference of the corresponding projection.

This configuration effectively limits leakage of the solid lubricant to the outside.

Each O-ring is preferably arranged between one of the projections and the corresponding absorbent member, and each O-ring preferably contacts the outer surface of the corresponding inner link plate and the inner surface of the corresponding outer link plate, while surrounding the outer circumference of the corresponding projection.

In this case, leakage of the solid lubricant to the outside is further effectively limited.

The present invention limits leakage of solid lubricant between a pin and a bushing to the outside for an extended period of time.

DETAILED DESCRIPTION OF THE PREFERRED EMBODIMENTS

A chain according to one embodiment will now be described with reference to the drawings.

Figure 1:
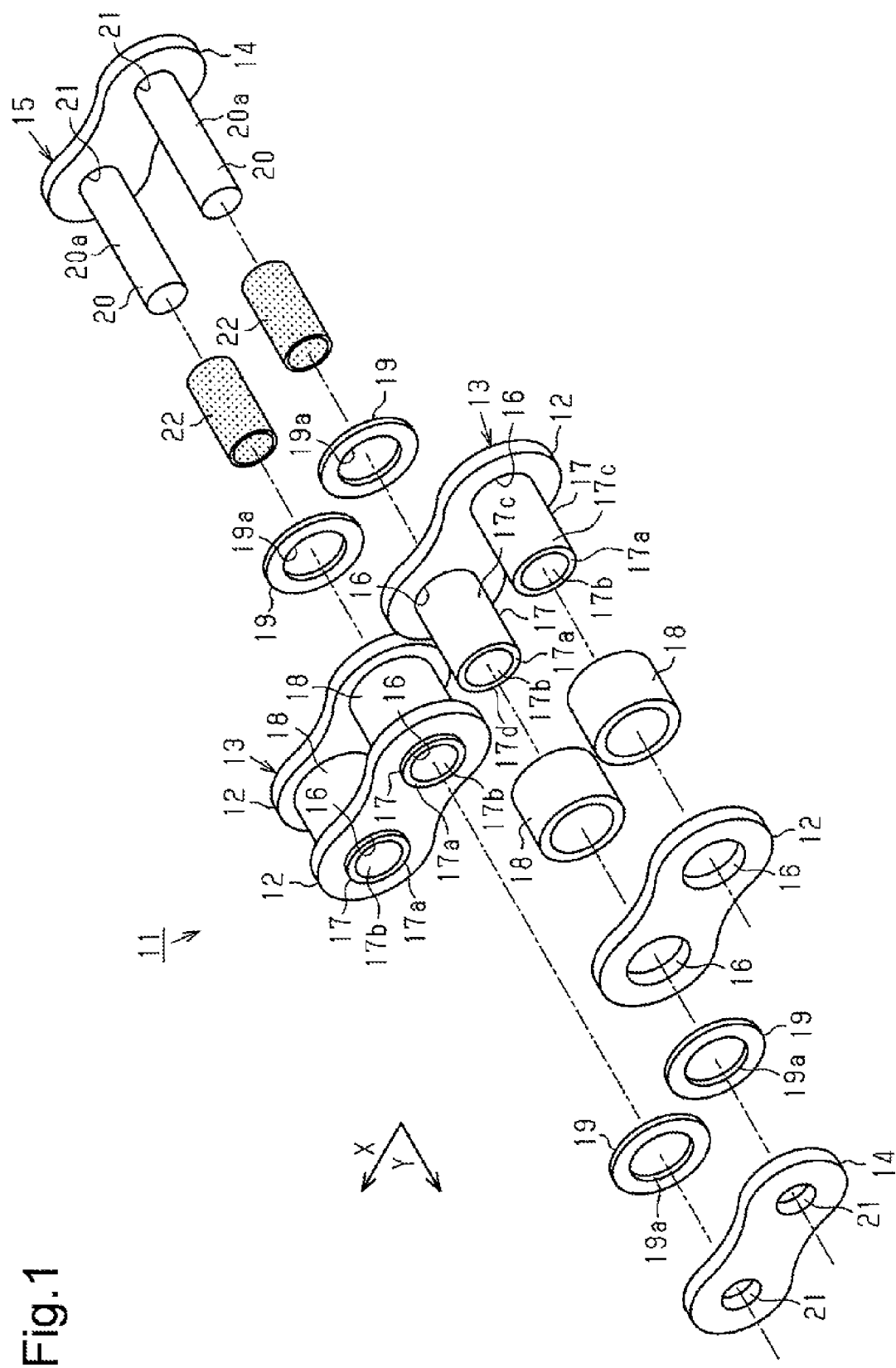
FIG. 1 is an exploded perspective view illustrating part of a chain according to one embodiment.
Figure 2:
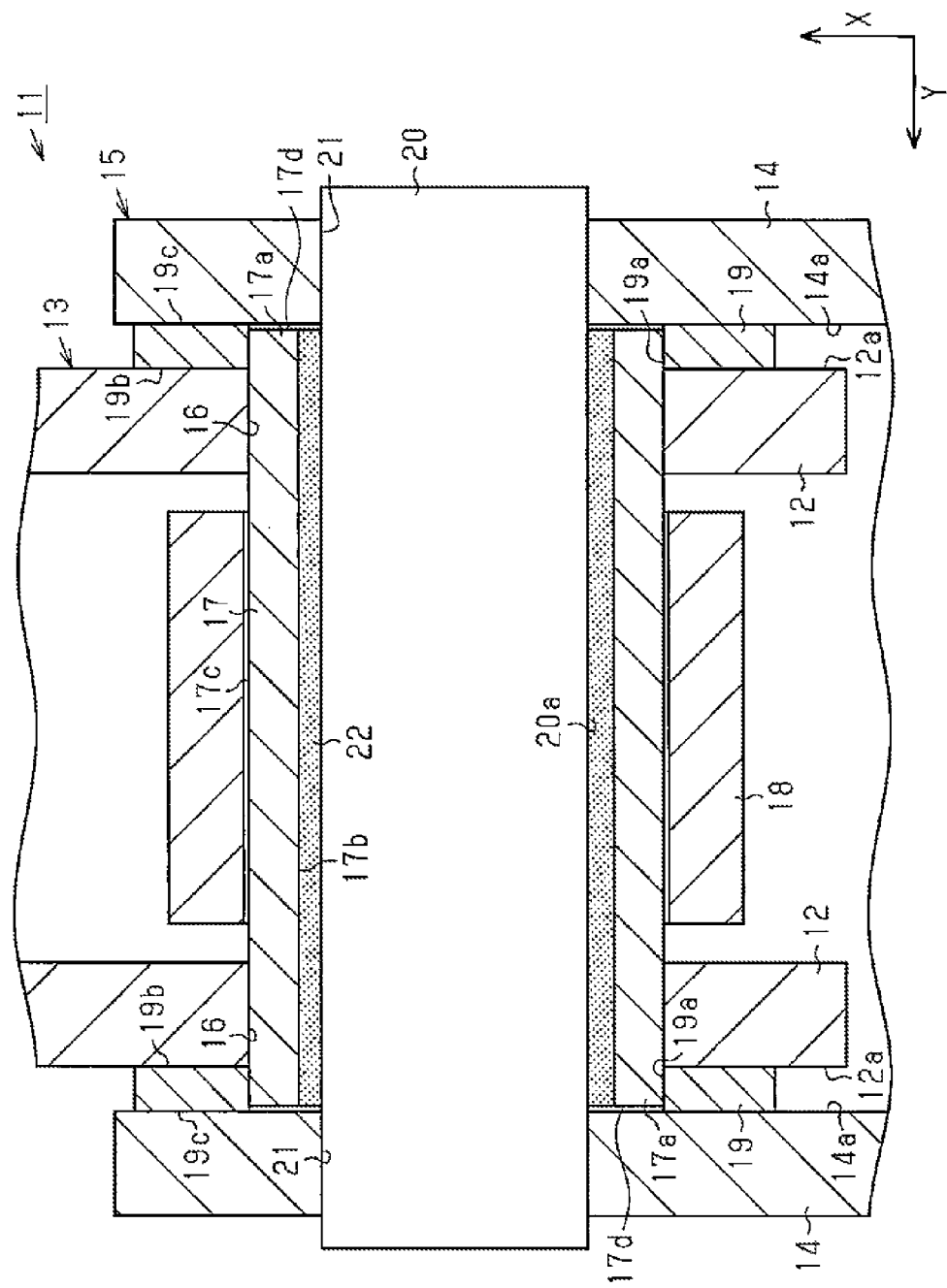
FIG. 2 is a cross-sectional view illustrating part of the chain shown in FIG. 1.

As shown in FIGS. 1 and 2, a chain 11 includes inner links 13 and outer links 15. Each inner link 13 has two inner link plates 12, which are opposed to each other in a width direction Y. Each outer link 15 has two outer link plates 14, which are arranged to sandwich pairs of the inner link plates 12 from outside with respect to the width direction Y.

The inner link plates 12 and the outer link plates 14 are each shaped as a plate having rounded corners and a constriction at the center. The inner link plates 12 and the outer link plates 14 are arranged parallel with each other to extend in an arrangement direction X, which is orthogonal to the width direction Y. When being pulled at one end in the longitudinal direction, the chain 11 moves in the arrangement direction X.

The chain 11 of the present embodiment is configured such that, in each inner link 13, the distances between the inner link plates 12 are the same at one end and the other end in the arrangement direction X, and that, in each outer link 15, the distances between the outer link plates 14 are the same at one end and the other end in the arrangement direction X. Thus, the chain 11 is a so-called flat chain.

Each inner link plate 12 has two circular bushing-receiving holes 16 at opposite ends. The bushing-receiving holes 16 extend through the thickness of the inner link plate 12, that is, in the width direction Y. Each inner link 13 has two cylindrical bushings 17 between the opposed inner link plates 12 to maintain the distance between the inner link plates 12.

The opposite ends of each bushing 17 are fitted in the bushing-receiving holes 16 of the inner link plates 12. The ends of the bushing 17 extend through the inner link plates 12 and project to the outside of the inner link plates 12. Such projecting portions, or projections 17a, each serve as a distance maintaining portion for maintaining the distance between an outer surface 12a of the inner link plate 12 and an inner surface 14a of the corresponding outer link plate 14. A narrow gap exists between an end face 17d of the bushing 17 and the inner surface 14a of the outer link plate 14.

Each bushing 17 is inserted in and rotationally supports a cylindrical roller 18. That is, the bushing 17 is loosely fit in the roller 18 arranged between two inner link plates 12. An annular absorbent member 19 is arranged between the outer surface 12a of each inner link plate 12 and the inner surface 14a of the corresponding outer link plate 14 to surround the outer circumference of the projection 17a of the corresponding bushing 17. The absorbent member 19 is capable of absorbing liquid lubricant such as grease.

Each outer link plate 14 has two circular pin-receiving holes 21 at the opposite ends in the arrangement direction X. The pin-receiving holes 21 extend through the outer link plate 14, that is, in the width direction Y. Each pin-receiving hole 21 receives a columnar pin 20, the outer diameter of which is slightly smaller than the inner diameter of the bushings 17. With the bushings 17 installed between two inner link plates 12 to form the inner link 13, the outer link plates 14 of an outer link 15 are pivotally coupled to the inner link plates 12 of the inner link 13 with the pins 20.

In this state, the intermediate section of each pin 20 is inserted in a bushing 17 between the two inner link plates 12 of an inner link 13, and the ends of the pin 20 are fitted in the corresponding pin-receiving holes 21 of the outer link plates 14 of an outer link 15. Thus, the ends of each pin 20 extend through the outer link plates 14, so that the inner link plates 12 of two inner links 13 adjacent to each other in the arrangement direction X are pivotally coupled to each other by the pins 20 and the bushings 17 of the two outer link plates 14 of an outer link 15.

Cylindrically shaped solid lubricant 22 is arranged between an inner circumferential surface 17b of each bushing 17 and an outer circumferential surface 20a of the corresponding pin 20 to lubricate relative pivoting action between the bushing 17 and the pin 20. Cylindrically molded graphite is employed as the solid lubricant 22. The chain 11 is made of steel.

The configuration of the absorbent members 19 will now be described.

With reference to FIGS. 1 and 2, the absorbent members 19 are made of a material that is capable of absorbing liquid and confining the solid lubricant 22 in a powdery state. The material preferably has elasticity that allows the absorbent members 19 to follow, during the use of the chain 11, changes in the gaps between the outer surfaces 12a of the inner link plates 12 and the inner surfaces 14a of the outer link plates 14. Also, the material preferably has a property that restricts a cut in one part from spreading to other sections.

Accordingly, the material for the absorbent members 19 may be felt, nonwoven fabric, or sponge. These materials are capable of absorbing liquid by capillary action. In the present embodiment, felt is employed as the material for the absorbent members 19. The absorbent members 19 absorb and retain liquid lubricant such as grease.

Each absorbent member 19 is configured such that its inner circumferential surface 19a contacts an outer circumferential surface 17c of the projection 17a of the corresponding bushing 17, that its inner surface 19b contacts the outer surface 12a of the corresponding inner link plate 12, and that its outer surface 19c contacts the inner surface 14a of the corresponding outer link plate 14. In this state, the absorbent member 19 is in a compressed state between the outer surface 12a of the inner link plate 12 and the inner surface 14a of the outer link plate 14. Thus, the absorbent member 19 confines the solid lubricant 22 when the solid lubricant 22 leaks through between the inner circumferential surface 17b of the bushing 17 and the outer circumferential surface 20a of the pin 20.

Next, operation of the absorbent members 19 during the use of the chain 11 will be described. The chain 11 of the present embodiment can be used in an environment in which dust of cement or coal is suspended in the air. However, once the chain 11 starts being used in such an environment, the solid lubricant 22 cannot be supplemented later.

When the chain 11 is used, the inner link plates 12 and the outer link plates 14 pivot relative to each other. At this time, the outer link plates 14 and the absorbent members 19 slide on each other, and the inner link plates 12 and the absorbent members 19 slide on each other. The absorbent members 19 are worn accordingly and may be broken.

However, in the present embodiment, the absorbent members 19, which are arranged between the inner link plates 12 and the outer link plates 14, are made of felt. Thus, even if any of the absorbent members 19 is broken and a cut is made, such a cut is unlikely to spread to other sections. Thus, the absorbent members 19 are not easily cut or do not easily come off, and therefore maintain the sealing performance for an extended period of time.

During the use of the chain 11, the solid lubricant 22 between the inner circumferential surface 17b of each bushing 17 and the outer circumferential surface 20a of the corresponding pin 20 may become powdery due to abrasion. Such powdery solid lubricant 22 acts to leak to the outside through the clearance between the end face 17d of the bushing 17 and the inner surface 14a of the outer link plate 14. However, such solid lubricant 22 is blocked by the absorbent members 19.

Therefore, the absorbent members 19 restrain the solid lubricant 22 from leaking to the outside of the chain 11 through the gaps between the inner circumferential surfaces 17b of the bushings 17 and the outer circumferential surfaces 20a of the pins 20 for an extended period of time. The absorbent members 19 also restrain exterior dust from entering, from the outside of the chain 11, into the gaps between the inner circumferential surfaces 17b of the bushings 17 and the outer circumferential surfaces 20a of the pins 20 for an extended period of time.

Further, the absorbent members 19 absorb and retain liquid lubricant, and the inner circumferential surfaces 19a contact the outer circumferential surfaces 17c of the projections 17a of the bushings 17. Thus, during the use of the chain 11, the liquid lubricant retained in the absorbent members 19 is gradually supplied to the gaps between the inner circumferential surfaces 17b of the bushings 17 and the outer circumferential surfaces 20a of the pins 20 through the gap between the end faces 17d of the bushings 17 and the inner circumferential surfaces 14a of the outer link plates 14. Accordingly, the gaps between the inner circumferential surfaces 17b of the bushings 17 and the outer circumferential surfaces 20a of the pins 20 are effectively lubricated by both the solid lubricant 22 and the liquid lubricant.

The above described embodiment achieves the following advantages.

(1) The solid lubricant 22 between the pins 20 and the bushings 17 is confined by the absorbent members 19, which are made of felt. Even if any of the absorbent members 19 is partially cut, the cut is less likely to cause the absorbent member 19 to tear and come off than in the case of conventional O-rings. The absorbent members 19 are thus capable of maintaining the sealing performance for a longer period of time than conventional O-rings. Thus, leakage of the solid lubricant 22 between the pins 20 and the bushings 17 to the outside and entry of foreign matter from the outside into the gaps between the pins 20 and the bushings 17 are limited for a longer period of time than in the case of conventional structures. Therefore, the chain 11 can be used in an environment in which dust of cement or coal is suspended in the air, that is, in an environment in which the solid lubricant 22 cannot be supplemented later.

(2) The absorbent members 19 absorb and retain liquid lubricant. Since the liquid lubricant is supplied to the gaps between the pins 20 and the bushings 17 from the absorbent members 19, the lubricity between the pins 20 and the bushings 17 is improved.

(3) The distance maintaining portions, which maintain the distances between the outer surfaces 12a of the inner link plates 12 and the inner surfaces 14a of the outer link plates 14 are constituted by the projections 17a, which project outward from the inner link plates 12 at the opposite ends of the bushings 17. That is, the distance maintaining portions are constituted by the projections 17a, which are parts of the bushings 17. Thus, the distances between the outer surfaces 12a of the inner link plates 12 and the inner surfaces 14a of the outer link plates 14 are maintained without increasing the number of components.

(4) The absorbent members 19 contact the outer surfaces 12a of the inner link plates 12 and the inner surfaces 14a of the outer link plates 14 while surrounding the outer circumferences of the projections 17a of the bushings 17. Thus, the solid lubricant 22 between the pins 20 and the bushings 17 is effectively restrained from leaking to the outside of the chain 11 from between the outer surfaces 12a of the inner link plates 12 and the inner surfaces 14a of the outer link plates 14.

(5) Since the absorbent members 19 are held in surface contact with the outer surfaces 12a of the inner link plates 12 and the inner surfaces 14a of the outer link plates 14, the dust caught between the contacting surfaces is unlikely to damage the absorbent members 19, the absorbent members 19 are thus unlikely to come off. This maintains the sealing performance of the absorbent members 19 for an extended period of time.

(6) Since the absorbent members 19 are made of felt, the volume of the absorbent members 19 can be increased to be greater than that of conventional O-rings.

(7) The absorbent members 19 are made of felt. Thus, even if any of the absorbent members 19 gets caught in other members during the assembly of the chain 11, the resultant scratches on the absorbent member 19 are not likely to affect other sections during the use. This improves the assemblability of the chain 11. If conventional O-rings were used as the absorbent members 19, and any of the absorbent members 19 got caught in other members, the resultant scratches in the O-ring quickly would spread during the use of the chain 11, causing the O-ring to come off at an early stage. Therefore, during the assembly of the chain 11, special care would be required not to cause the O-rings to get caught, which would degrade the assemblability of the chain 11.

(8) The projections 17a of the bushings 17 maintain the distances between the outer surfaces 12a of the inner link plates 12, on which the absorbent members 19 are arranged, and the inner surfaces 14a of the outer link plates 14. Thus, when the chain 11 receives load in the width direction Y, the distances between the outer surfaces 12a of the inner link plates 12 and the inner surfaces 14a of the outer link plates 14 are not reduced to values lower than or equal to a predetermined value. This prevents the inner link plates 12 and the outer link plates 14 from excessively crushing the absorbent members 19. The sealing performance of the absorbent member 19 is thus prevented from deteriorating.

If the distances between the outer surfaces 12a of the inner link plates 12 and the inner surfaces 14a of the outer link plates 14 were not maintained, and once the absorbent members 19 were excessively crushed, the absorbent members 19 would not restore the original shape even if the load on the absorbent members 19 were removed. Further, the absorbent member 19 would be compacted and likely to be damaged. Thus, if the distances between the outer surfaces 12a of the inner link plates 12 and the inner surfaces 14a of the outer link plates 14 were increased, gaps might form between the absorbent members 19 and the outer surfaces 12a of the inner link plates 12, or gaps might form between the absorbent members 19 and the inner surfaces 14a of the outer link plates 14. This would degrade the sealing performance of the absorbent members 19, and the solid lubricant 22 would be likely to leak to the outside through such gaps.

Modifications

The above described embodiment may be modified as follows.

Figure 3:
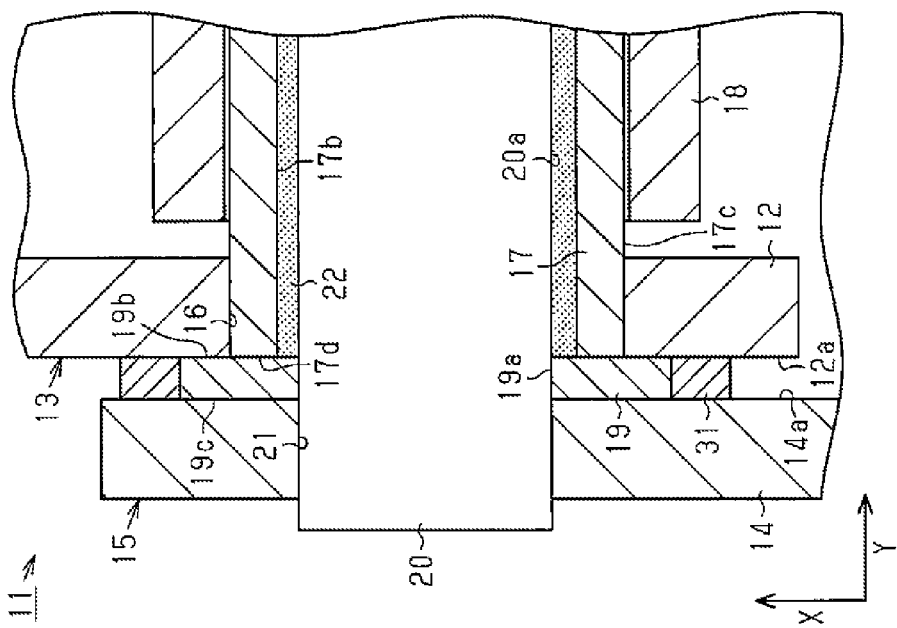
FIG. 3 is a cross-sectional view illustrating part of a chain according to a first modification.

As in a first modification shown in FIG. 3, an O-ring 30 may be arranged between the projection 17a of the bushing 17 and the absorbent member 19 to surround the projection 17a. The O-ring 30 contacts the outer surface 12a of the inner link plate 12 and the inner surface 14a of the outer link plate 14. This improves the sealing performance for the solid lubricant 22. Also, even if the O-ring 30 is cut, the O-ring 30 remains held by the absorbent member 19 and is thus prevented from falling off.

Figure 4:
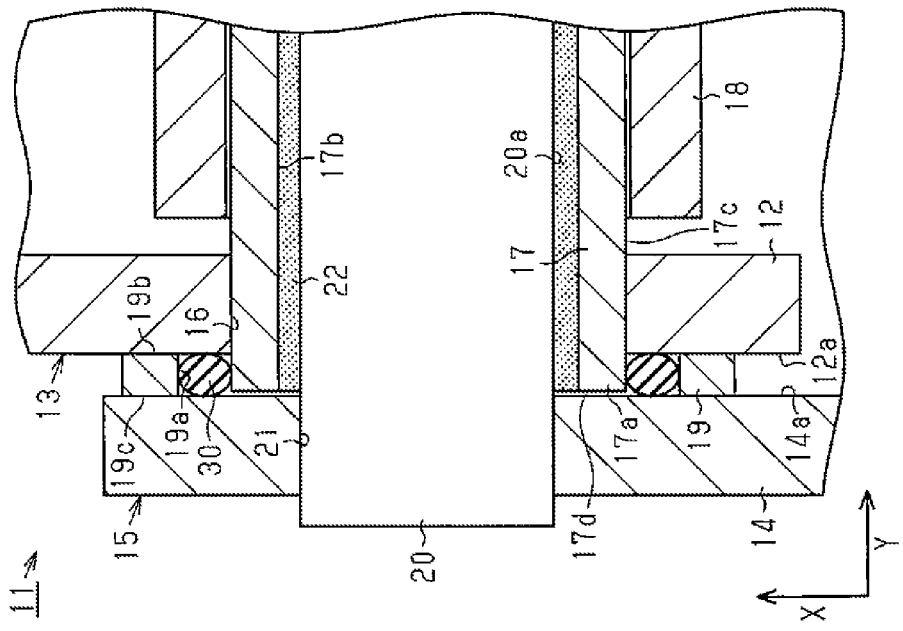
FIG. 4 is a cross-sectional view illustrating part of a chain according to a second modification.

As in a second modification shown in FIG. 4, the projection 17a of the bushing 17 may be omitted, and an annular spacer 31 may be arranged as the distance maintaining portion to surround the outer circumference of the absorbent member 19. The spacer 31 contacts the outer surface 12a of the inner link plate 12 and the inner surface 14a of the outer link plate 14. The spacer 31 is capable of holding the absorbent member 19, while maintaining the distance between the outer surface 12a of the inner link plate 12 and the inner surface 14a of the outer link plate 14. Thus, even if the absorbent member 19 is cut, the absorbent member 19 is prevented from falling off.

The absorbent members 19 do not necessary need to retain liquid lubricant.

The rollers 18 may be omitted.

The chain 11 may be an offset-type chain. The links of such a chain each have two opposed link plates that are shaped such that the space between the link plates at one end in the arrangement direction X is narrower than the space between the link plates at the other end. These link plates are pivotally coupled together by bushings 17 and pins 20.

The chain 11 may be made of synthetic plastic.

DESCRIPTION OF THE REFERENCE NUMERALS

11 . . . Chain; 12 . . . Inner Link Plate; 14 . . . Outer Link Plate; 17 . . . Bushing; 19 . . . Absorbent Member; 20 . . . Pin; 22 . . . Solid Lubricant; 17*a* . . . Projection as an example of Distance Maintaining Portion

The invention claimed is:

1. A chain comprising:
   two inner link plates that are opposed to and spaced from each other;
   a cylindrical bushing having two opposite ends, each of which is joined to one of the inner link plates;
   a pin inserted in the bushing;
   solid lubricant arranged between the bushing and the pin;
   two outer link plates, which are arranged to sandwich the inner link plates from outside, wherein the opposite ends of the pin each extend through one of the outer link plates;
   distance maintaining portions, each of which maintains a distance between an outer surface of one of the inner link plate and an inner surface of the corresponding outer link plate;
   a liquid lubricant; and
   absorbent members, each of which is arranged between the outer surface of one of the inner link plate and the inner surface of the corresponding outer link plate, wherein the absorbent members confine the solid lubricant and are capable of absorbing the liquid lubricant,
   wherein the absorbent members absorb and retain the liquid lubricant, and
   wherein the absorbent members each surround an axial end of the solid lubricant.

2. The chain according to claim 1, wherein opposite ends of the bushing extend through the inner link plates and project to the outside of the inner link plates, and the distance maintaining portions are constituted by projections that project to the outside of the inner link plates at the opposite ends of the bushing.

3. The chain according to claim 2, wherein the absorbent members each contact the outer surface of the corresponding inner link plate and the inner surface of the corresponding outer link plate, while surrounding an outer circumference of the corresponding projection.

4. The chain according to claim 3, further comprising O-rings, wherein each O-ring is arranged between one of the projections and the corresponding absorbent member, and each O-ring contacts the outer surface of the corresponding inner link plate and the inner surface of the corresponding outer link plate, while surrounding the outer circumference of the corresponding projection.

\* \* \* \* \*